United States Patent
Eisenbach et al.

(10) Patent No.: US 8,882,958 B2
(45) Date of Patent: Nov. 11, 2014

(54) DEVICE AND METHOD FOR WELDING PROFILED PARTS

(75) Inventors: Bernd Eisenbach, Brechen (DE); Hans Schmitt, Rammstein (DE)

(73) Assignee: ROTOX Besitz-und Verwaltungsgesellschaft mbH, Brechen (DE)

( * ) Notice: Subject to any disclaimer, the term of this patent is extended or adjusted under 35 U.S.C. 154(b) by 116 days.

(21) Appl. No.: 13/636,150

(22) PCT Filed: Feb. 1, 2011

(86) PCT No.: PCT/EP2011/051396
§ 371 (c)(1),
(2), (4) Date: Oct. 22, 2012

(87) PCT Pub. No.: WO2011/117007
PCT Pub. Date: Sep. 29, 2011

(65) Prior Publication Data
US 2013/0037211 A1   Feb. 14, 2013

(30) Foreign Application Priority Data
Mar. 22, 2010 (DE) .................. 10 2010 012 359

(51) Int. Cl.
*B32B 37/00* (2006.01)
*B29C 65/00* (2006.01)
*B29C 65/20* (2006.01)
*B29L 31/00* (2006.01)

(52) U.S. Cl.
CPC ............. *B29C 66/8412* (2013.01); *B29C 66/92* (2013.01); *B29L 2031/005* (2013.01); *B29C 66/95* (2013.01); *B29C 66/52431* (2013.01); *B29C 66/8161* (2013.01); *B29C 66/92651* (2013.01); *B29C 66/71* (2013.01); *B29C 66/8163* (2013.01); *B29C 65/203* (2013.01); *B29C 66/843* (2013.01); *B29C 66/1162* (2013.01); *B29C 66/8748* (2013.01); *B29C 66/8242* (2013.01); *B29C 66/9674* (2013.01); *B29C 66/8223* (2013.01)
USPC .................... 156/304.2; 156/304.6; 156/378; 156/499; 156/538

(58) Field of Classification Search
USPC ........ 156/304.1, 304.2, 304.6, 499, 538, 556, 156/580, 583.1, 378
See application file for complete search history.

(56) References Cited

U.S. PATENT DOCUMENTS

| | | | |
|---|---|---|---|
| 7,748,427 B2 * | 7/2010 | Maruyama et al. | ........... 156/499 |
| 2008/0223526 A1 | 9/2008 | Maruyama et al. | |

FOREIGN PATENT DOCUMENTS

| | | |
|---|---|---|
| DE | 94 13 889 U1 | 11/1994 |
| DE | 196 29 302 A1 | 1/1998 |
| DE | 198 32 397 A1 | 1/2000 |
| EP | 2 255 942 A1 | 12/2010 |

* cited by examiner

*Primary Examiner* — James Sells
(74) *Attorney, Agent, or Firm* — Panitch Schwarze Belisario & Nadel LLP (57) ABSTRACT

The invention relates to a device for welding profiled parts (8), in particular plastics profiled parts, having at least one welding head (1) that can be positioned in a predetermined or predeterminable target welding position (6) relative to another welding head (1, 9) and/or relative to a holding device. According to the invention the welding head (1) and/or a part of the welding head (1), that comprises at least one heating element, such as a heating plate, for melting the profiled parts, can be positioned and/or is movable in accordance with at least one dimensional variation of at least one of the profiled parts (8) from a target dimension in a spatial tolerance range (5) around the target welding position (6).

20 Claims, 12 Drawing Sheets

DEVICE AND METHOD FOR WELDING PROFILED PARTS

CROSS-REFERENCE TO RELATED APPLICATIONS

This application is a national stage application (under 35 U.S.C. §371) of PCT/EP2011/051396, filed Feb. 1, 2011, which claims benefit of German application 10 2010 012 359.5, filed Mar. 22, 2010.

TECHNICAL FIELD AND STATE OF THE ART

The invention relates to a device for welding profiled parts, especially plastic profiled parts, comprising at least one welding head that can be positioned in a pre-specified or pre-specifiable target welding position relative to another welding head and/or relative to a holding device.

The invention also relates to a method for welding profiled parts, especially plastic profiled parts.

Devices of the above-mentioned type are used especially for welding PVC profiles in order to form window frames or door frames. Such a device is disclosed, for example, in German patent application DE 195 06 236 A1. This device has four welding heads for purposes of simultaneously producing the four corner joints of a frame.

The stability of windows made of PVC is achieved by the welded joint of the corners, by the PVC profile itself and by pieces of reinforcement steel that are inserted into the PVC profiles and then screwed to them.

In the last two years, the German quality-assurance institute for plastic products SKZ (SUddeutsche-Kunststoff-Zentrum) has conducted a research project titled "Improving and evaluating the cost-efficiency of welding PVC window profiles" and has ascertained that, fundamentally speaking, the equalization times as well as the heating times can be markedly reduced when higher welding temperatures are used. As of now, however, there is no information as to how these research findings can be employed in actual practice.

Prior to the welding, the profiles are mitered and cut to the required length, after which they are placed into the welding device. At the present time, precisions of about ±0.5 mm can be achieved for the cut and precisions of about ±1 mm are common, whereby imprecisions ranging from about ±0.2 mm to about ±0.3 mm within the cutting surface itself also occur, the same applying to imprecisions pertaining to the angle of the miter.

The actual welding of the profiled parts is done by softening and subsequently joining the ends of the profiles. When the profile ends are softened and joined, a portion of the softened material is displaced which is then lost to the profile length. This portion is referred to as the size allowance.

In the case of the devices known from the state of the art, the welding heads are adjusted, especially positioned, exclusively on the basis of the theoretical target dimensions of the profiles for the frame that is to be welded. Accordingly, electronic controls move the welding heads to fixed pre-specified points for producing a frame and are then locked in place there.

Particularly in order to compensate for length tolerances of the profiles, a size allowance of about 3 mm—in other words, about 6 mm with respect to the total profile—is normally provided for at each end of the profile, an aspect that has to be taken into consideration when the profiles are cut to size. Accordingly, the softening time of the profile ends when they make contact with so-called heat reflectors is approximately 30 seconds (±15%) on the average, depending on the profile that is to be processed. The joining time, in other words, the time during which the softened profile ends are pressed against each other, is likewise approximately 30 seconds (±15%) on the average, depending on the profile that is to be processed. In this context, it can happen that, when high heat-reflector temperatures are used, the material undergoes a change, especially decomposition or burning, which can ultimately have a detrimental effect on the appearance and lead to reduced fracture values. The risk of such undesired changes is greater the longer the time of exposure to heat and the higher the temperature.

German patent application DE 196 29 302 A1 discloses a device for joining profiled parts made of plastic, especially for window or door frames and the like, by means of welding employing at least two, preferably four welding aggregates. Each welding aggregate has a movable profile stop that serves to align the profiles that have been put in place. For each profile stop, a centering device for centering the profiles is provided on the associated welding aggregate, and this centering device individually moves each of the profiles that are to be aligned with respect to the welding aggregate to the profile stop, and subsequently moves away from the profile stop.

German patent application DE 196 35 955 A1 discloses a welding machine for welding preferably plastic profiled parts, whereby an adjustment plate is provided whose thickness can be varied.

The two above-mentioned devices known from the state of the art also allow the use of profiled parts that have a dimensional deviation. Allowing such dimensional deviations by using a profile stop that is movable or a profile stop whose thickness can be varied, however, has the drawback that the profiled parts are arranged offset and/or asymmetrically with respect to the welding head, especially with respect to the heat reflector of the welding head. This entails the additional disadvantage that the ends of the profiled parts that are to be welded to each other undergo a different softening process. For instance, it can happen that one profiled part is pressed more strongly and for a longer period of time against the heat reflector than the profiled part to which it is going to be welded. This gives rise to welds with reduced strength values. In the worse-case scenario, it can even occur that the plastic of at least one of the ends of the profiled parts might undergo the above-mentioned decomposition or burning.

For this reason, the industry continues to seek a device and a method for welding profiled parts that allow a shortening of the welding process as well as a reduction in the requisite size allowance, while also reducing the risk of material changes.

SUMMARY OF THE INVENTION

A device for welding profiled parts has a welding head and/or parts of the welding head that can be positioned and/or are movable within a tolerance area around the target welding position as a function of at least one dimensional deviation displayed by at least one of the profiled parts.

A method for welding profiled parts, especially plastic profiled parts, is characterized by the following steps:
 a. specifying a target welding position for a welding head and/or for a part of the welding head,
 b. positioning the welding head or the part of a welding head, but at least one heating element, especially a heat reflector, within a pre-specified or pre-specifiable tolerance area around the target welding position, whereby the distance between the welding head or the parts of the welding head and the target welding position of at least one dimensional deviation displayed by a profiled part is a function of a target dimension, c. softening or melting the profiled parts that are to be welded, and d. joining the softened or melted profiled parts.

It has been recognized that allowing slight dimensional tolerances—at least prior to the welding process—yields very considerable advantages for the product that is to be created by means of welding, particularly in terms of the softening and joining times as well as in terms of the risk of undesired material changes. For example, during the manufacture of window or door frames, deviations of the outer dimensions of the frame amounting to about 0.5 mm—in view of a gap dimension of about 12 mm between the leaf and door frames—can be accepted without any problem without this translating into technical limitations in the function or usability of the windows or doors. However, the softening and joining times can be drastically reduced (while attaining approximately the same or sometimes greater strength of the joint thus created). As a result, the total production time is shortened, so that within the same unit of time, a larger number of window or door frames can be manufactured.

In a particularly advantageous embodiment, which is described in detail further below, however, the dimensional tolerances initially allowed during the welding process can also be eliminated or at least reduced. Consequently, this embodiment entails a two-fold advantage, namely, the ability to produce more quickly and more efficiently on the one hand, and a high level of dimensional precision on the other hand.

In an advantageous embodiment of the device according to the invention, the welding head and/or a part of the welding head, but at least one heating element of the welding head for softening the profiled parts, especially a heat reflector, can be automatically positioned within a spatial tolerance area around the target welding position—preferably within the support plane. According to the invention, it can particularly be provided that the device has a compensation device that positions or moves the welding head and/or the part of the welding head within a spatial tolerance area around the target welding position as a function of at least one dimensional deviation displayed by at least one of the profiled parts. An especially advantageous embodiment is one in which the compensation device automatically or autonomously undertakes the positioning within the tolerance area. When the device according to the invention is used, smaller size allowances are possible than the size allowances necessary when the devices known from the state of the art are used. Accordingly, considerably shorter softening times or equalization times are needed. Advantageously, softening times are made possible that are so short (a few seconds) that the ends of the profiled parts can be heated up without material changes, even when the heat reflector is at higher temperatures, something which is virtually impossible without undesired material changes at the softening times known from the state of the art.

With a particularly advantageous embodiment, the positioning within the tolerance area is done—preferably automatically—in such a way that the distance between the ends of the profiled parts that are to be welded to each other and the heating element, especially a heat reflector, is the same. In particular, it can be provided that the positioning within the tolerance area is done—preferably automatically—in such a way that the distance between the ends of the profiled parts that are to be welded to each other and the heat reflector is the same prior to the time of the softening process, especially prior to the time when the ends of the profiled parts approach the heating element, especially a heat reflector. Moreover, advantageously and according to the invention, it can be provided that the ends of the profiled parts that are to be welded to each other are moved synchronously and/or mirror-symmetrically relative to the heating element during the softening process, especially during the approach to the heating element, and/or during the joining. Thanks to one or more of these techniques, it is advantageously achieved that the ends of the profiled parts that are to be welded to each other undergo precisely the same process, especially the same softening process and/or joining process.

Hence, it is possible to largely prevent the drawback associated with the methods and devices known from the state of the art, namely, that the ends of the profiled parts that are to be welded to each other each undergo a different softening process. In an advantageous manner, it is especially prevented that one end of the profiled part is already in contact with the heat reflector while the end of the profiled part to be welded to the end of the first profiled part is still on its way to the heat reflector—for instance, because of a larger initial distance—and/or it is prevented that one end of the profiled part is still in contact with the heat reflector while the end of the profiled part that is to be welded to the end of the first profiled part has already moved away from the heat reflector. As described, according to the invention, it is possible to effectively avoid the situation that occurs with the methods and devices known from the state of the art, namely, that one end of the profiled part is in contact with the heat reflector longer than necessary because, to a certain extent, there is a need to wait until the end of the profiled part that is to be welded to the end of the first profiled part has already softened as well.

In the case of an embodiment of the device according to the invention that can especially be used universally, it is provided that the size of the tolerance area can be pre-specified and/or selected. As a result, the device can be adapted individually to the requirements of the product to be manufactured and to the individual material properties of the profiled parts to be employed.

The distance between a welding head or the part of the welding head within the tolerance area and the target position depends on at least one dimensional deviation from a target dimension displayed by one of the profiled parts to be welded.

Accordingly, the positioning can be done, for example, in that the dimensional deviation displayed by a profiled part that is to be welded is first ascertained quantitatively—preferably by means of direct measurement—so that the positioning within the tolerance area can be subsequently carried out actively—for instance, using a motor-driven adjustment device, which can be part of the compensation device. A mechanical and/or optical and/or electronic sensor can be provided for the quantitative detection of the dimensional deviation. The positioning can also take place, for instance, during the joining process itself.

As an alternative or in addition, it can also be provided according to the invention that the positioning is done passively, namely, through a mechanical orientation with respect to the outer contours of the profiled part by means of stops and guides.

In a special embodiment, a positioning unit is provided with which the welding head or the part of the welding head is first placed in the target welding position and subsequently, for example, during the joining process, it is positioned within the tolerance area especially by controlling and/or regulating the drives. However, it can also be provided that the positioning unit is moved to a target welding position, while, at the same time, a fine positioning is carried out within the tolerance area. In both variants, it can be advantageously provided that the welding head and/or the part of the welding head, but at least one heating element of the welding head for softening the profiled parts, especially a heat reflector, is mounted—especially resiliently—so as to be movable within the tolerance area relative to the positioning unit.

In one particularly reliable and precisely functioning device, the welding head and/or the part of the welding head, but at least one heating element of the welding head for softening the profiled parts, especially a heat reflector, is mounted so as to be movable within the tolerance area against the force of a spring means relative to the target welding position and/or relative to the positioning unit.

Here, it can be provided, for instance, that, for purposes of the positioning within the tolerance area, the welding head and/or the part of the welding head is pressed and/or supported against at least one profiled part that has been placed into the device. Alternatively or additionally, it can also be provided that a profiled part placed into the device moves the welding head and/or the part of the welding head against the force of the spring means or that a profiled part placed into the device positions the welding head—preferably autonomously or automatically—within the tolerance area.

In a special embodiment configured as a multi-head device, several—preferably four—spring elements are installed on the welding heads, and they allow the head position to be aligned, for example, within a range of about ±0.5 mm. The spring elements are provided in order to absorb and compensate for deviations in the target length displayed by the profiled parts in this order of magnitude. In other words, if one place of the cross section of a profiled part is, for instance, 0.2 mm longer than the target length, a welding head or at least a part of the welding head, but at least one heating element of the welding head for softening the profiled parts, especially a heat reflector, during the joining process automatically moves by this amount towards the target length deviation displayed by the profile. If, in contrast, a profiled part is, for example, 0.3 mm shorter than the pre-specified target length, the spring element pushes the welding head, or at least the part of the welding head, in the opposite direction by the amount of the target length deviation of 0.3 mm. Thus, the final position of the welding head is oriented in accordance with the actual length of the profiled part.

The spring elements can be installed on the welding heads themselves, so that, during the positioning, the entire welding head or the part of the welding head is oriented on the basis of the length of the profiled part. As an alternative or in addition, the spring elements can be installed on the welding tools and/or on the lateral profile contacts and/or on the profile stop, so that, for example, only the position of one profile contact is changed relative to the length of a profiled part. Here, the profile stop can also be coupled to a profile contact.

In order to restrict the dimensional deviations displayed by the product that is to be created, in one advantageous embodiment, an alarm is provided that emits an alarm signal if the welding head and/or the part of the welding head is positioned outside of the tolerance area. As an alternative or in addition, it can be provided that the alarm emits an alarm signal if the measurement of a profiled part determines that the profiled part displays a dimensional deviation from a target dimension that is too large for the provided tolerance area or if, prior to a positioning process, the compensation device ascertains on the basis of the dimensional deviation displayed by at least one of the profiled parts that the positioning would have to be selected outside of the tolerance area.

The device according to the invention can be advantageously configured as a multi-head device, especially as a four-head device. Accordingly, several welding heads can be provided which can fundamentally be positioned relative to another welding head and/or relative to a holding means in different, pre-specified or pre-specifiable welding positions, whereby the welding heads and/or a part of the welding heads, but at least one heating element of the welding head for softening the profiled parts, especially a heat reflector, can be positioned according to the invention within a spatial tolerance area around the target welding position additionally as a function of at least one dimensional deviation from a pre-specified or pre-specifiable target dimension displayed by at least one profiled part. In particular, it can be provided that a compensation device—preferably autonomously or automatically—positions the welding heads or the parts of the welding heads within the tolerance area as a function of at least one dimensional deviation.

In a very advantageous embodiment, the device has several welding heads, whereby one of the welding heads is arranged and/or can be arranged so as to be stationary and whereby the other welding heads and/or a part of the other welding heads, but at least one heating element of the welding head for softening the profiled parts, especially a heat reflector, can each be positioned and/or moved within a spatial tolerance area around a target welding position as a function of at least one dimensional deviation from a target dimension displayed by at least one of the profiled parts.

For example, it can be provided that a welding head is arranged and/or can be arranged so as to be stationary relative to a base frame and that the other welding heads can be positioned and/or moved according to the invention within their own spatial tolerance area around a given target welding position. In this manner, it is achieved according to the invention that the effort needed to achieve the positionability or the movability within a given tolerance area is reduced. In this context, it has been recognized that, in the final analysis, it boils down to the relative positionability or movability of the welding heads (or of the parts of the welding heads) with respect to each other.

A dimensional deviation as set forth in this invention can be, for instance, the deviation from a pre-specified or pre-specifiable target length and/or the deviation from a pre-specified or pre-specifiable miter angle and/or the deviation from a pre-specified or pre-specifiable evenness of a cut surface.

In the case of a particularly advantageous embodiment, it is provided that the dimensional tolerances that are still permissible prior to a welding process are eliminated or at least reduced during the welding process. Regarding this aspect, it can be especially provided according to the invention that, in order to reduce or completely eliminate at least one dimensional deviation from a target dimension displayed by a profiled part, the welding process, particularly the process of softening and/or the process of joining, is controlled in such a way that, during the softening and/or during the joining, a force directed towards the target position acts on the welding head or on the part of the welding head that has first been positioned within a tolerance area around a target welding position.

In this context, alternatively or additionally it can also be provided that, in order to reduce or completely eliminate at least one dimensional deviation from a target dimension displayed by a profiled part, the welding process, particularly the process of softening and/or the process of joining, is controlled is such a way that, during the softening and/or during the joining, a force directed towards the appertaining target position acts on the welding heads or on the parts of the welding heads that have first been positioned within a tolerance area around their target welding positions.

The force that acts on the welding head or on the part of the welding head during the welding process in order to reduce and/or eliminate dimensional deviations displayed by the profiled parts can be applied, for instance, pneumatically and/or hydraulically and/or by means of a spindle system. In particular, a preferably electronic control unit can be provided that switches off the acting force when the target position has been reached and/or that already reduces the acting force when the target position is being approached. In a simple and yet reliable and dependable embodiment, it is provided that the target position is determined by means of one or more mechanical stops and that the force moves the welding head or the part of the welding head during the welding until the stop or the stops has/have been reached, thus preventing the welding head from being moved further beyond the target position.

In an especially advantageous embodiment, the welding process, especially the process of softening and/or the process of joining, is controlled in such a manner that the welding head or the part of the welding head that has first been positioned within a tolerance area around a target welding position reaches or at least approaches its target welding position during the softening and/or during the joining.

In particular, the welding process, especially the process of softening and/or the process of joining, can also be controlled according to the invention in such a way that, during the softening and/or during the joining, the welding heads or the parts of the welding heads that have first been positioned within a tolerance area around their target welding positions reach or at least approach their target welding positions.

DESCRIPTION OF THE DRAWINGS

Additional objectives, advantages, features and application possibilities of the present invention ensue from the description below of several embodiments on the basis of the drawings. In this context, all of the described and/or depicted features, either on their own or in any meaningful combination, constitute the subject matter of the present invention, also irrespective of their compilation in the claims to which they refer back.

The drawings schematically depict the subject matter of the invention, which is described below making reference to the figures, whereby identical or identically functional elements are usually provided with the same reference numerals. The following is shown.

DETAILED DESCRIPTION OF EMBODIMENTS

Figure 1:
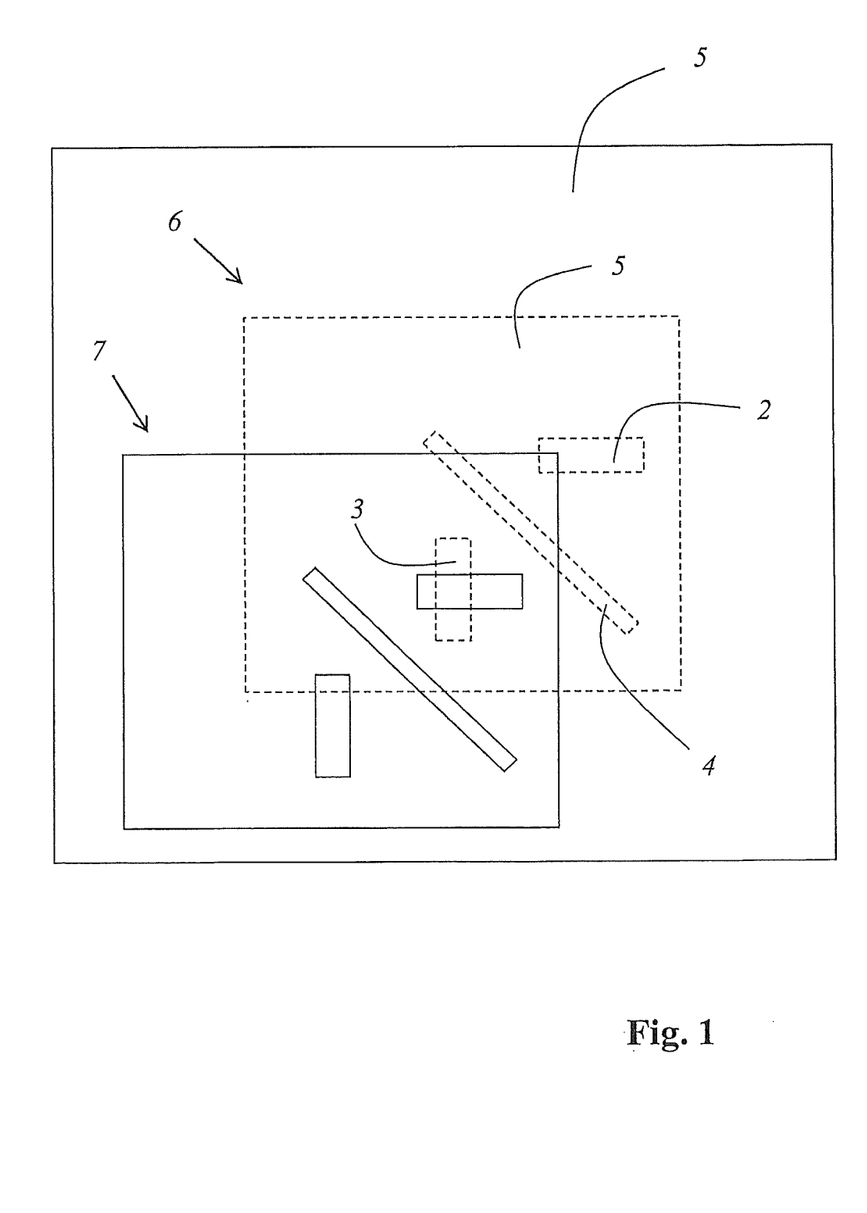
FIG. 1 the mode of operation of a device according to the invention, on a welding head.

FIG. 1 shows the mode of operation of a device according to the invention, on a welding head 1. For the sake of clarity, the welding heads shown are only depicted schematically, with two profile contacts 2, 3 and one profile stop 4. In the case of the devices known from the state of the art, the welding head 1 is positioned in a target welding position shown by a broken line in the figure, and this is done completely independently of dimensional deviations displayed by the profiled parts that are to be welded. In contrast to this, with the device according to the invention, the welding head 1 (and/or parts of the welding head) are positioned within a spatial tolerance area 5 around the target welding position 6 (broken line) as a function of at least one dimensional deviation from a target dimension displayed by at least one of the profiled parts that is to be welded (not shown here). The actual positioning 7 within the tolerance area 5 is shown by a solid line. The positioning shown corresponds to a situation in which the profiled part (not shown here) that is in contact with the first profile contact 2 is longer than the target dimension, while the profiled part (not shown here) that is in contact with the second profile contact 3 is shorter than the target dimension.

Figure 2:
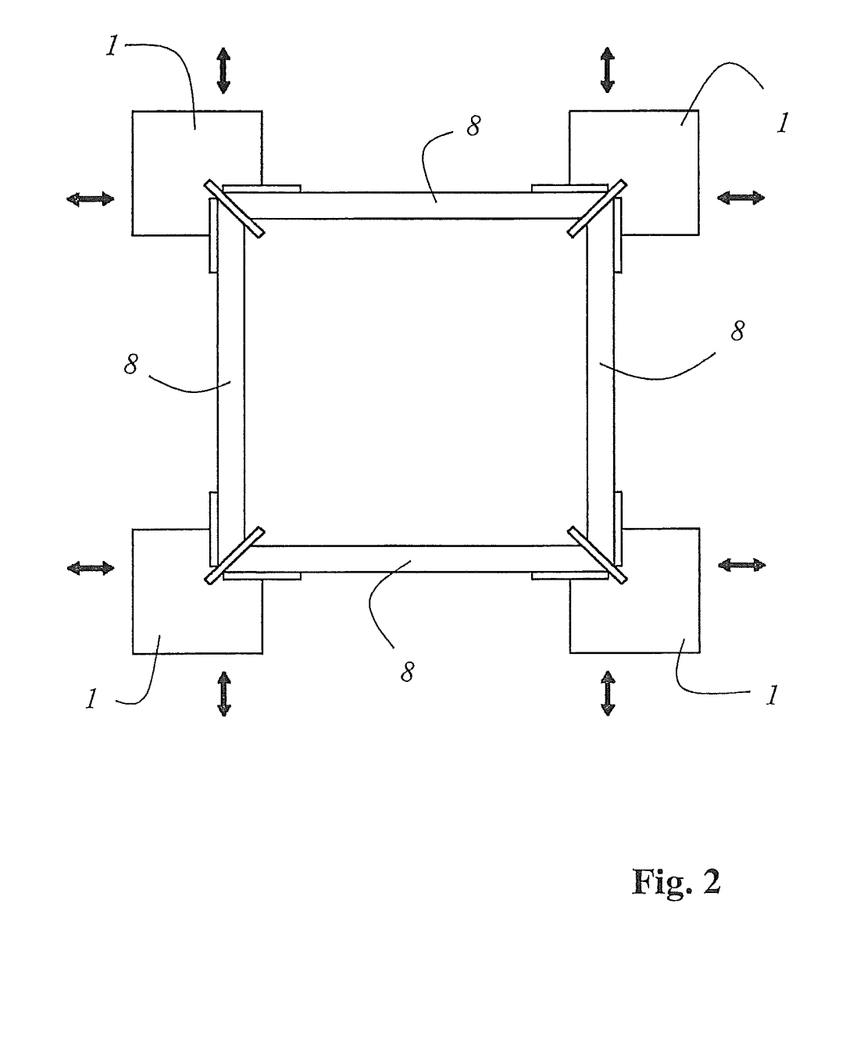
FIG. 2 schematically, a device according to the invention configured as a four-head welding machine.

FIG. 2 schematically shows a device according to the invention configured as a four-head welding machine. In this device, as indicated by the double-headed arrows, all four welding heads 1 can be positioned or moved relative to a base frame (not shown here) within a spatial tolerance area around the appertaining target welding position as a function of at least one dimensional deviation displayed by at least one profiled part 8.

Figure 3:
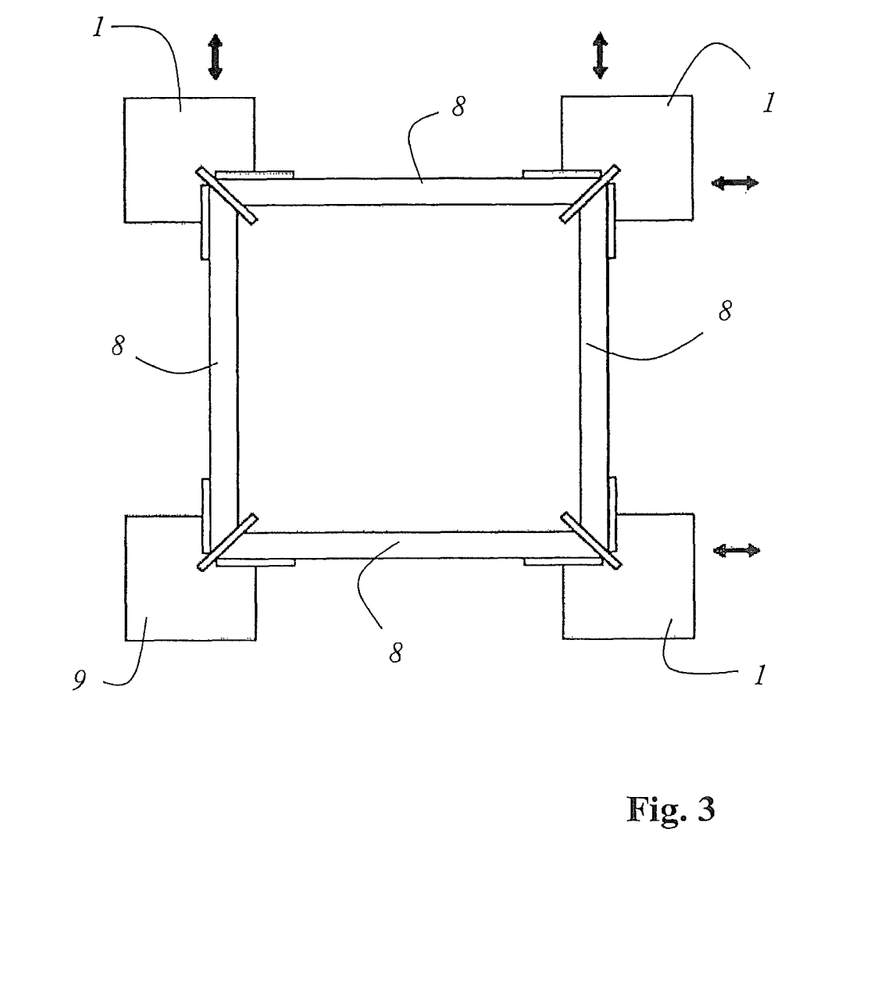
FIG. 3 schematically, another embodiment of a device according to the invention.

FIG. 3 schematically shows another configuration of a device according to the invention, wherein a first welding head 9 is arranged so as to be stationary and wherein the other welding heads 1 can each be positioned and/or moved within a spatial tolerance area around an appertaining target welding position as a function of at least one dimensional deviation from a target dimension displayed by at least one of the profiled parts 8. This embodiment functions just as reliably as the device shown in FIG. 2. However, the effort needed to achieve the positionability or movability within a given tolerance area has been reduced in that only three welding heads 1 need to be appropriately equipped and configured.

Figure 4:
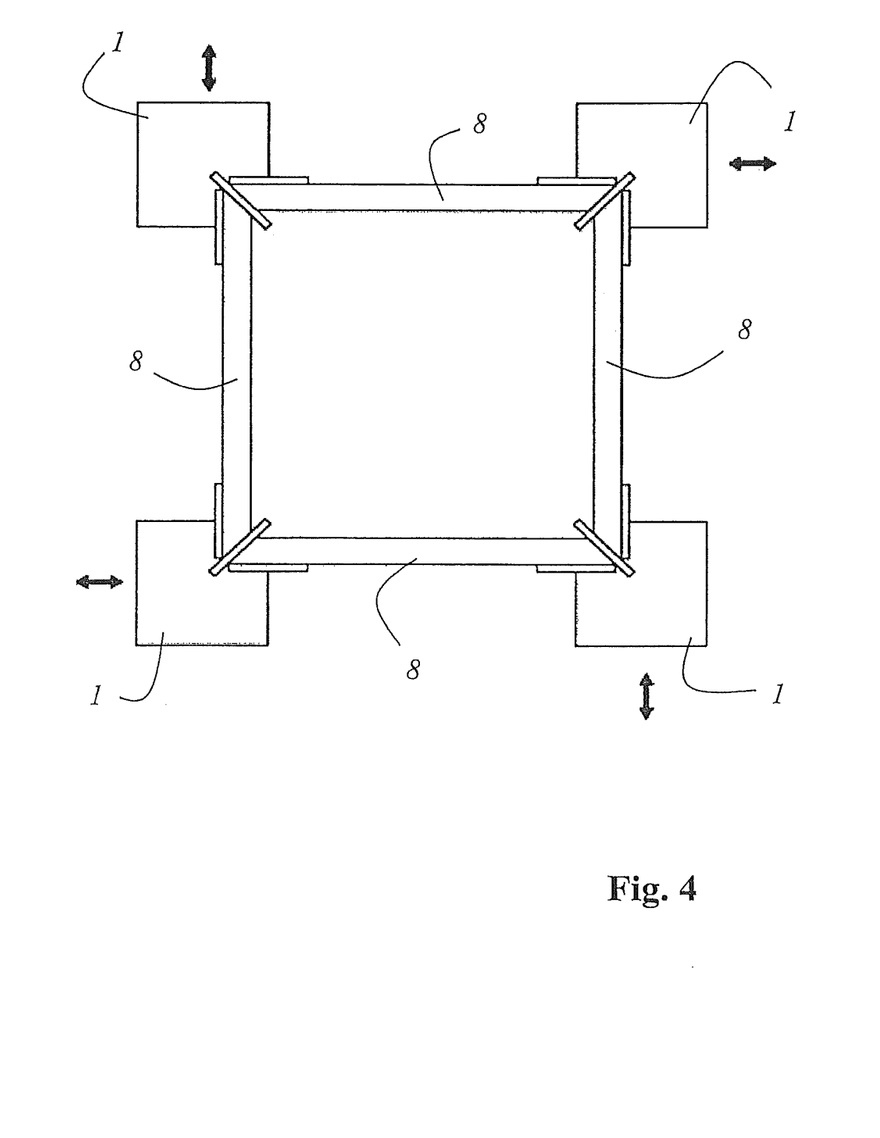
FIG. 4 schematically, another embodiment of a device according to the invention.

FIG. 4 schematically shows another embodiment of a device according to the invention in which each welding head 1 is mounted so that it can be moved linearly, whereby the directions of movement of welding heads situated diagonally opposite from each other are parallel to each other. This embodiment has the special advantage that elaborate biaxial bearings that require, for example, cross tables, can be avoided without impairing the functionality.

Figure 5:
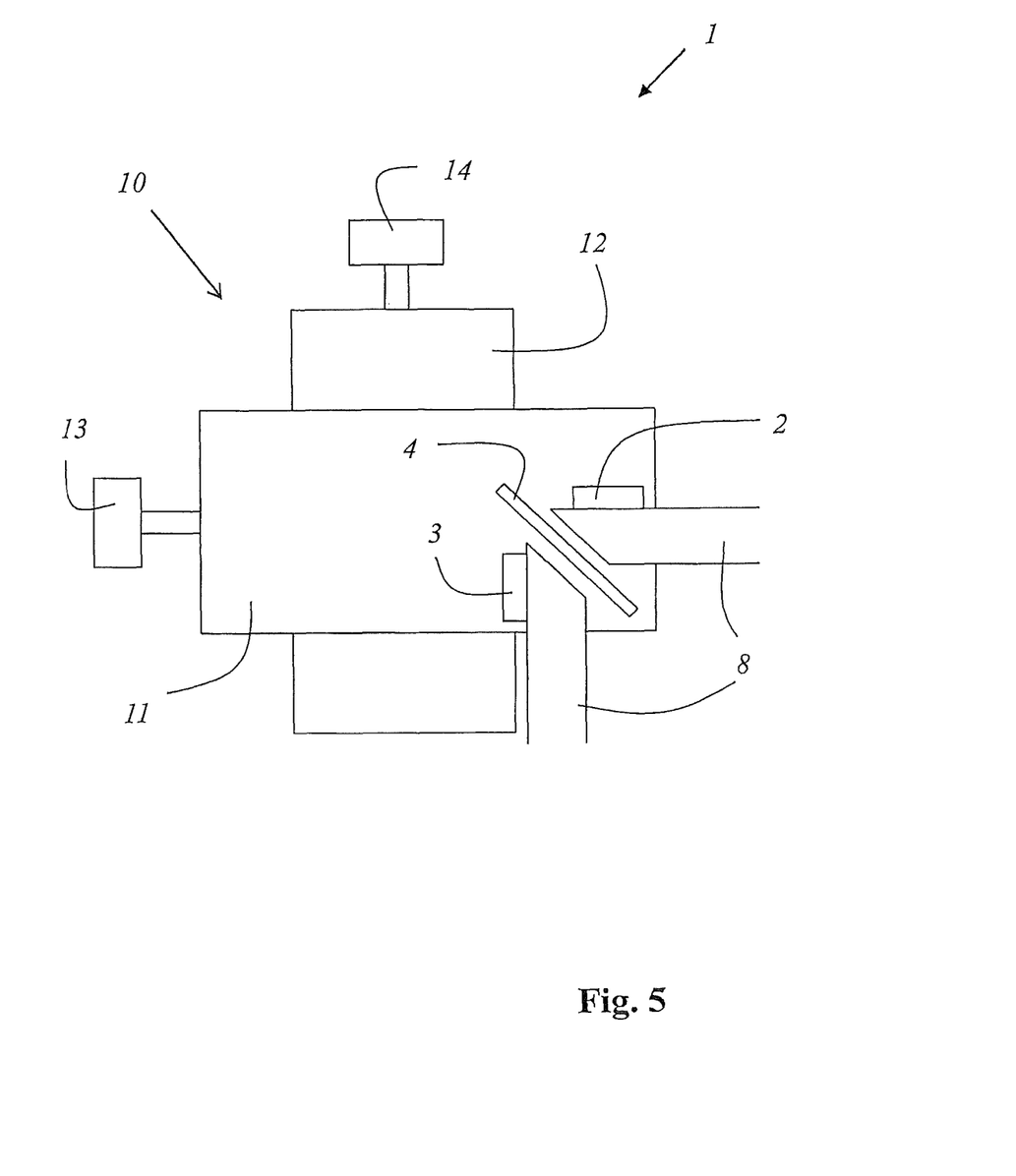
FIG. 5 schematically, an example of a welding head for purposes of demonstrating another way to achieve another device according to the invention.

FIG. 5 schematically shows an example of a welding head 1 as another way to achieve another device according to the invention. The welding head 1 has an X-Y table 10 comprising a base table 11 and a cross table 12, whereby the base table 11 can be moved in a first direction by means of a first drive 13, and whereby the cross table 12, together with the base table 11, can be moved perpendicular to the first direction into a contact plane by means of a second drive 14. On the base table 11, there are two profile contacts 2, 3 by means of which the profiled parts 8, 8 that are to be welded to each other can be pressed against a profile stop by moving the cross table 12 and the base table 11 against a profile stop 4. In order to position the parts of the welding head 1 within the tolerance area, the drives 13, 14 are automatically controlled as a function of dimensional deviations from the target dimension displayed by the profiled parts.

Figure 6:
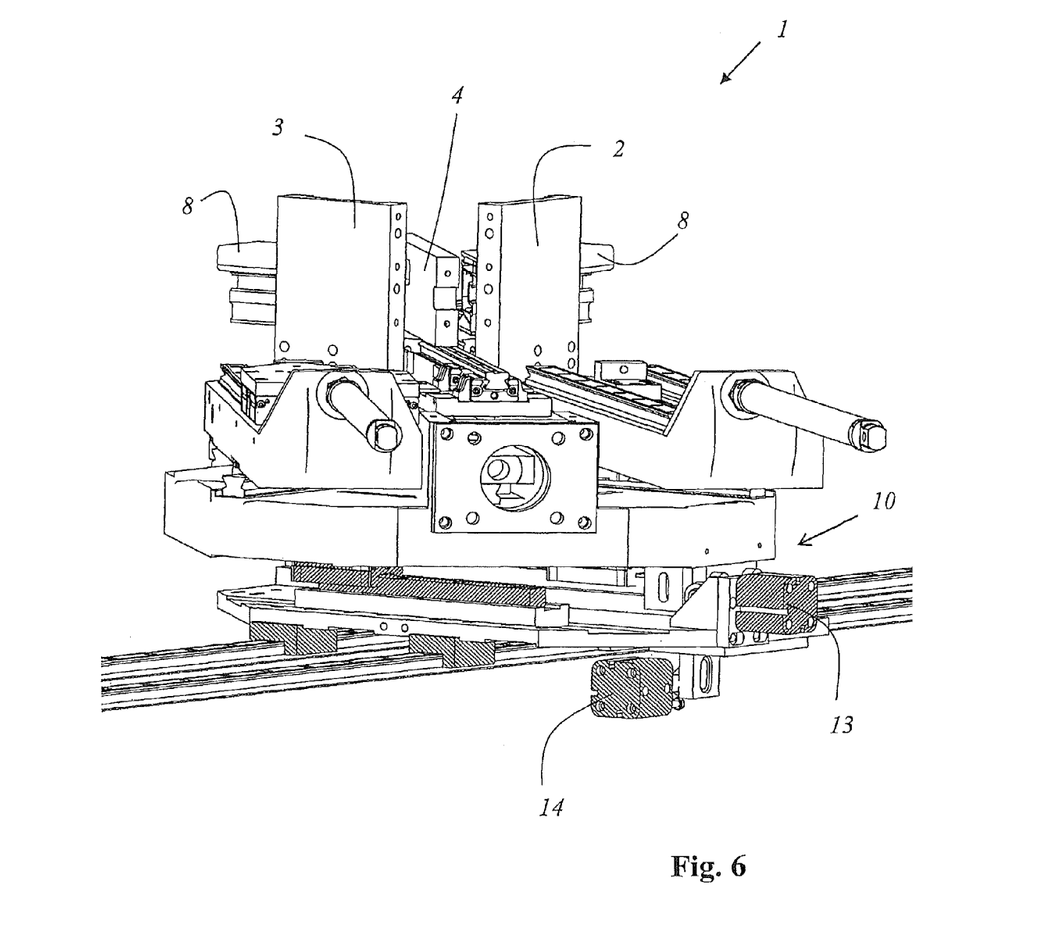
FIG. 6 a detailed view of a device according to the invention.

FIG. 6 shows a detailed view of a device according to the invention, comprising a cross table 10 and drives 13, 14 that serve to position the welding head 1 within a tolerance area. Especially a profile stop 4 and two lateral profile contacts 2, 3 for the profiled parts 8 that are to be welded can be clearly seen here.

Figure 7:
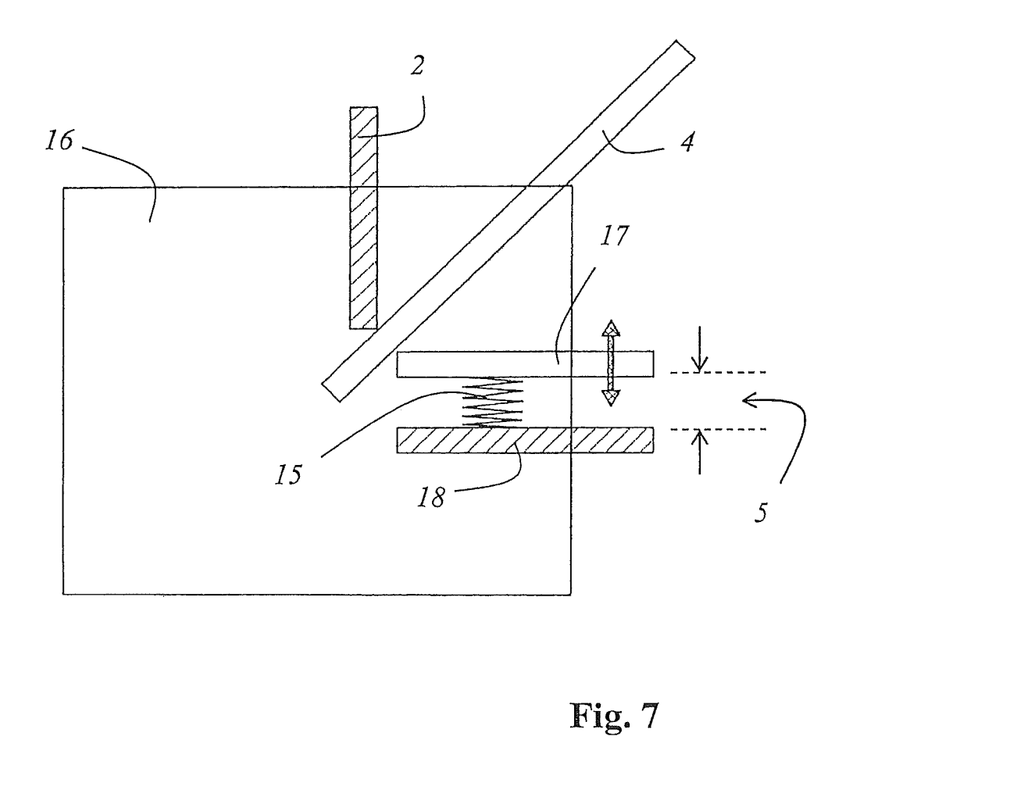
FIG. 7 a detailed view of another device according to the invention.

FIG. 7 shows a detailed view of another device according to the invention which, aside from a profile stop 2 that cannot be moved relative to a profile support 16, also has a profile stop 17 that can be moved within a tolerance area—against the force of a spring means 15—relative to a profile support 16. A panel 18 is mounted on the profile support 16 so as to be stationary with respect to the profile support 16, said panel 18 serving as the base for the resilient bearing of the movable profile stop 17. In addition, a heat reflector (not shown here) is positioned within the tolerance area analogously the movable profile stop 17.

Figure 8:
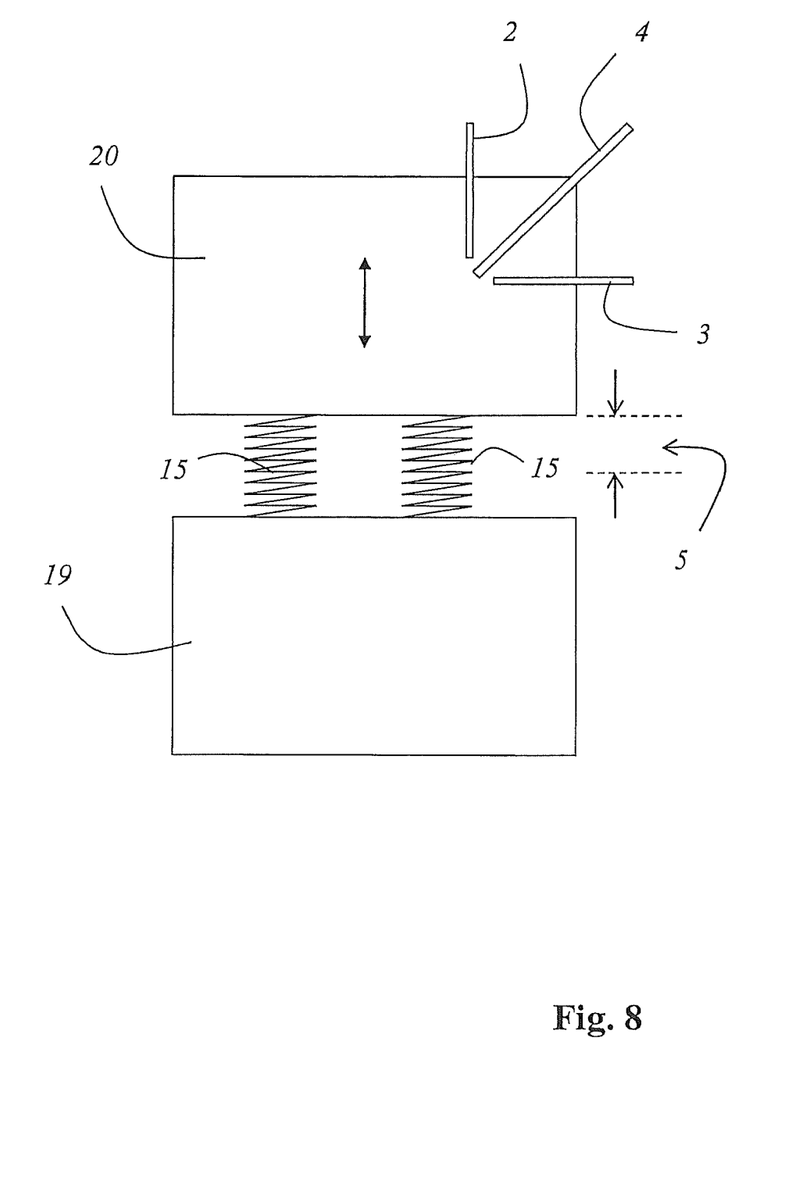
FIG. 8 a detailed view of another device according to the invention.

FIG. 8 shows a detailed view of another device according to the invention wherein the welding head has a drive carriage 19 and a support carriage 20 that can be moved relative to the drive carriage 19 within the tolerance area against the force of a spring means 15. The welding head can be positioned by means of the drive carriage 19 in a target welding position 6. The support carriage 20 positions itself autonomously and automatically within the tolerance area 5 in that it presses itself against the profiled part that has been placed into the device (not shown in this figure).

Figure 9:
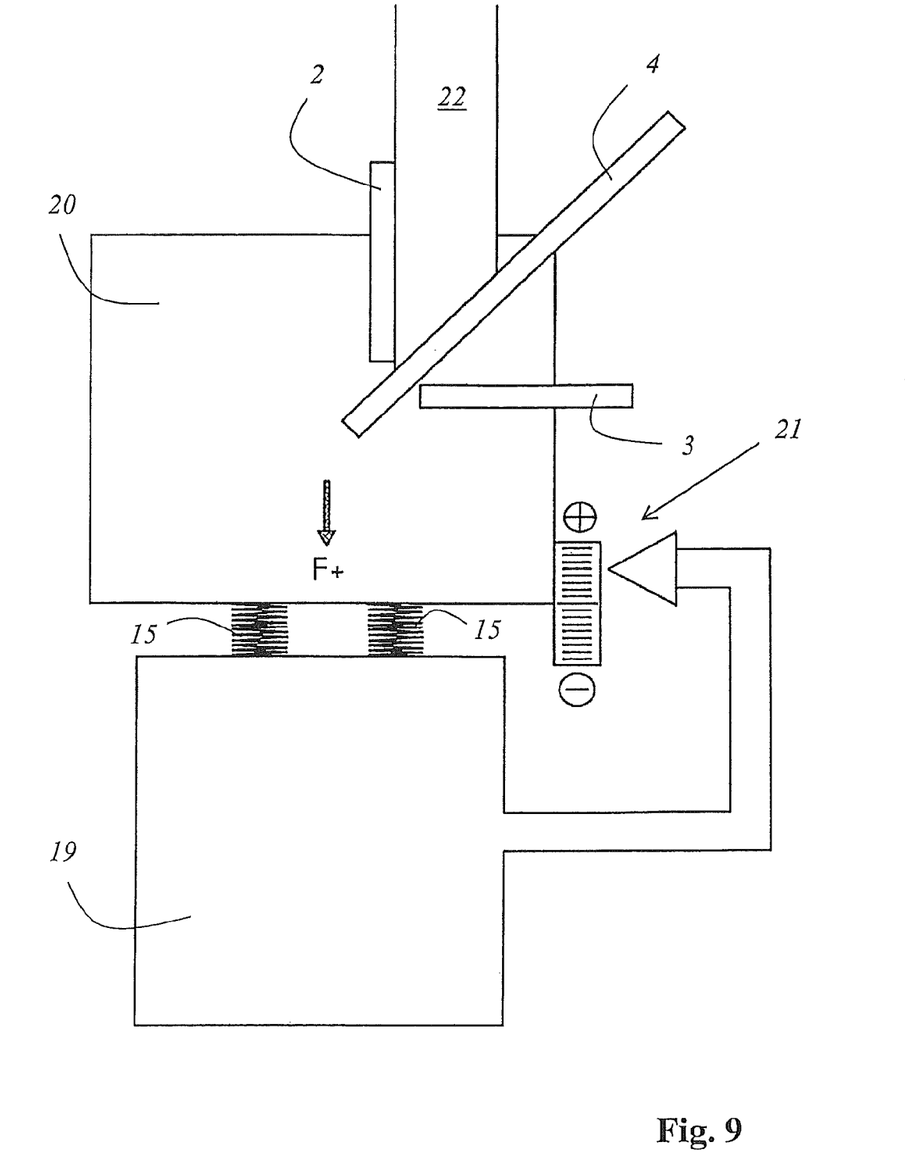
FIG. 9 a detailed view of the other device according to the invention, showing an excessively long profiled part, after it has been put in place.

FIG. 9 depicts a detailed view of the other device according to the invention that was already presented in FIG. 8, showing an excessively long profiled part 8, after it has been put in place. The device shown has a dimensional deviation display 21 whose scale is essentially stationary relative to the support carriage 20 and whose pointer is stationary relative to the drive carriage 19. The center of the scale marks the target position. The ends of the scale mark the edge of the tolerance area. It can be seen on the dimensional deviation display 21 that, due to its excessive length, the profiled part that has been put in place has pushed the support carriage 20 into the tolerance area in the direction of the drive carriage 19 against the recovery force of the spring means 15.

Figure 10:
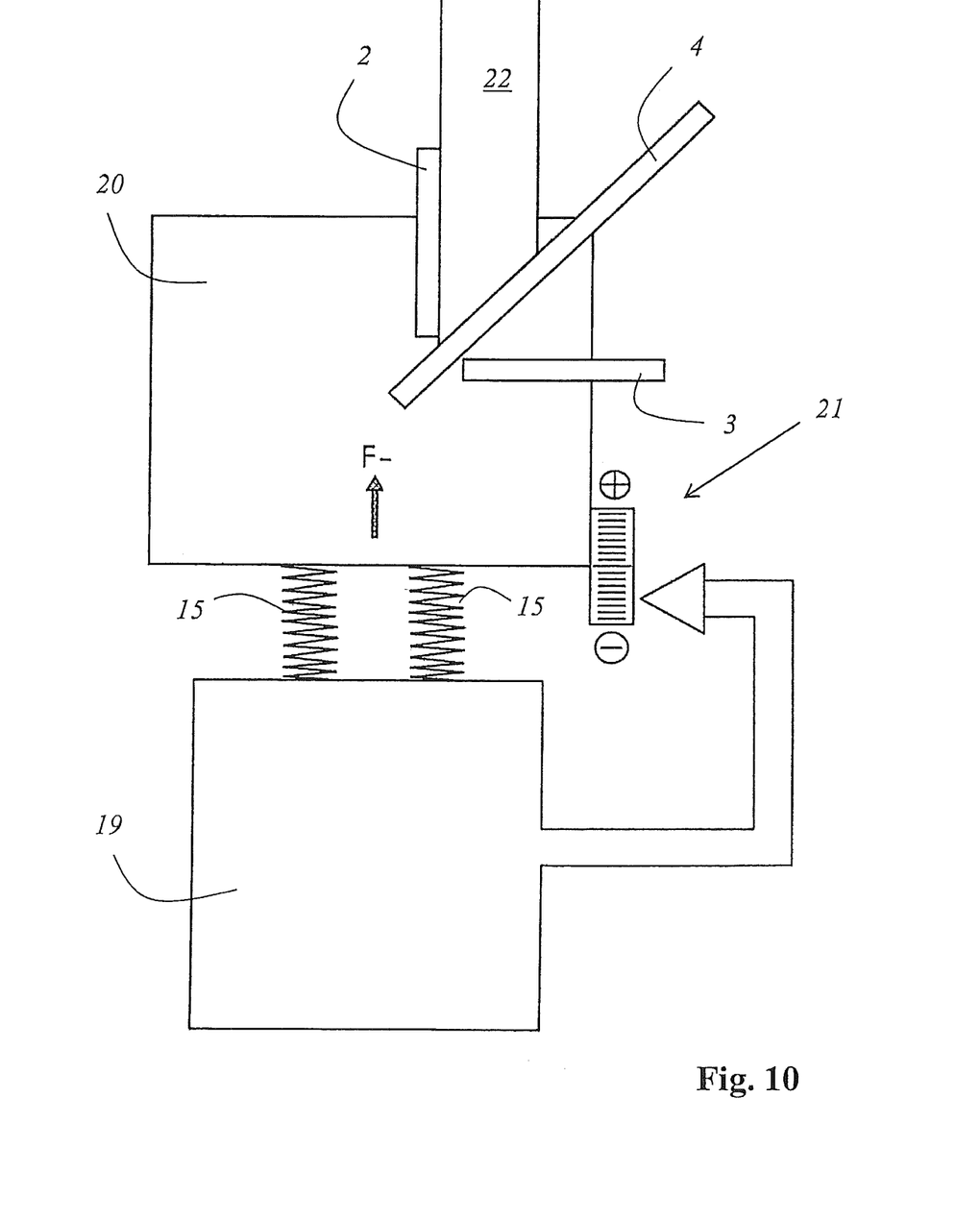
FIG. 10 a detailed view of the other device according to the invention, showing an excessively short profiled part, after it has been put in place.

FIG. 10 depicts a detailed view of the other device according to the invention that was already presented in FIGS. 8 and 9, showing an excessively short profiled part 8, after it has been put in place. It can be seen on the dimensional deviation display 21 that the support carriage 20 was pushed by the spring means 15 into the tolerance area towards the drive carriage 19 until the profile stop 4 made contact with the excessively short profiled part 8 after it had been put in place.

Figure 11:
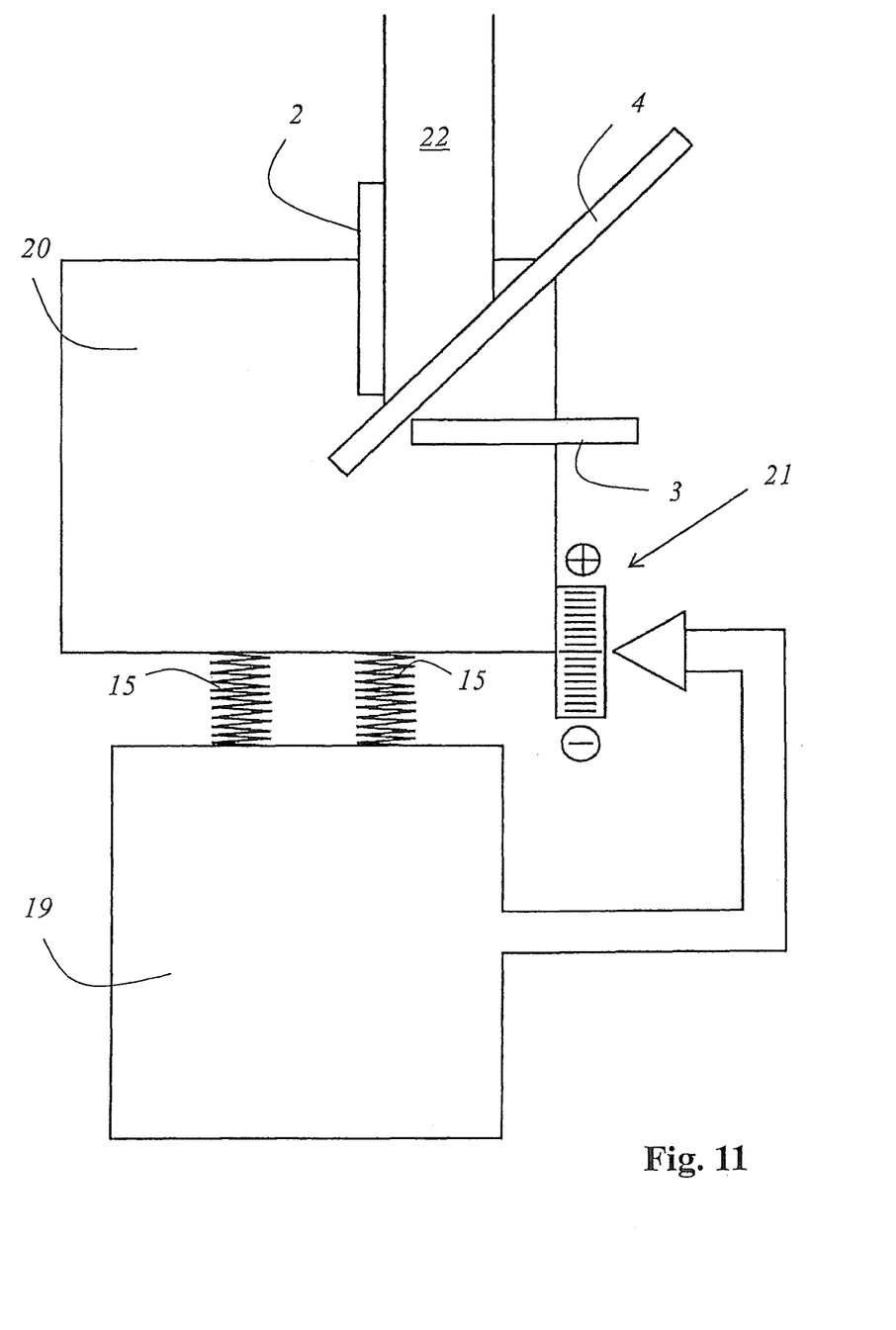
FIG. 11 a detailed view of the other device according to the invention, showing a dimensionally precise profiled part, after it has been put in place.

FIG. 11 depicts a detailed view of the other device according to the invention with a precisely dimensioned profiled part 8, after it has been put in place, as was already shown in FIGS. 8, 9 and 10. It can be seen on the dimensional deviation display 21 that the support carriage 20, together with the profile contacts 2, 3 and the profile stop 4, is in the target position.

Figure 12:
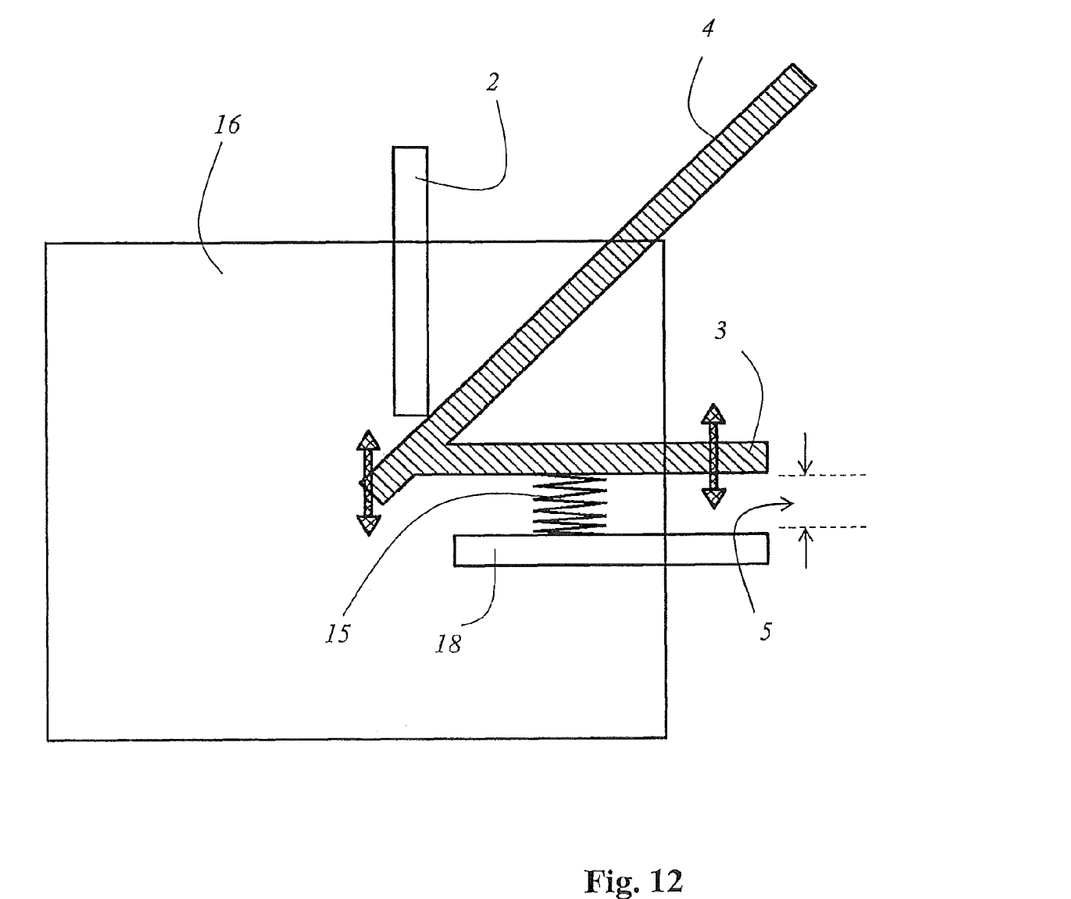
FIG. 12 a detailed view of a special device according to the invention.

FIG. 12 shows a detailed view of a special device according to the invention wherein the profile stop 4 is firmly attached to a profile contact 3 and both parts are arranged so as to be jointly movable relative to a profile support 16. A panel 18 is mounted on the profile support 16 so as to be stationary relative to the profile support 16, said panel 18 serving as the base for the resilient bearing of the movable profile stop 17.

The profile stop 4 and the profile contact 3 are mounted so that they can be moved linearly within the tolerance area against the force of a spring means 15.

In all of the embodiments described in the figures by way of examples, it can be additionally provided that, in order to reduce or completely eliminate at least one dimensional deviation from a target dimension displayed by a profiled part 8, the welding process, especially the process of softening and/or the process of joining, is controlled in such a way that a force directed towards the target position 6 acts on the welding head 1, 9 or on the part of the welding head that has first been positioned within a tolerance area around a target welding position 6.

The invention was described in conjunction with one or more special embodiments. It goes without saying, however, that changes and modifications can be undertaken without departing from the protective scope of the claims below.

LIST OF REFERENCE NUMERALS 1 welding head
2 lateral profile contact
3 lateral profile contact
4 profile stop
5 tolerance area
6 target welding position
7 actual positioning
8 profiled parts
9 first welding head
10 X-Y table
11 base table
12 cross table
13 first drive
14 second drive
15 spring means
16 profile support
17 movable profile stop
18 panel
19 drive carriage
20 support carriage
21 dimensional deviation display

The invention claimed is:

1. A device for welding profiled parts (8), especially plastic profiled parts, comprising:
    a first profile contact (2) for contacting a first profiled part (8);
    a second profile contact (3) for contacting a second profiled part (8)
    wherein the first profile contact (2) and the second profile contact (3) are movable to position the first profiled part (8) and second profiled part (8) into a target welding position; and
    at least one welding head (1) having at least one heating element for softening or melting the profiled parts that is positioned autonomously or automatically in the target welding position (6) relative to another welding head (9) within a tolerance area (5) around the target welding position (6) as a function of at least one dimensional deviation displayed by at least one of the profiled parts (8).

2. The device according to claim 1, wherein the tolerance area (5) has a pre-specified or pre-selected size.

3. The device according to claim 1, further comprising a sensor for the detection of the at least one dimensional deviation selected from the group consisting of: a mechanical sensor, an optical sensor, and an electronic sensor.

4. The device according to claim 1, further comprising a positioning unit for positioning the welding head (1) or a part thereof in the target welding position (6).

5. The device according to claim 1, wherein the welding head (1) or a part thereof is mounted so as to be movable at least within the tolerance area (5) either relative to the positioning unit or relative to the target welding position (6).

6. The device according to claim 1, further comprising a spring (15), wherein the welding head (1) or a part thereof is movable at least within the tolerance area (5) against the force of the spring (15) either relative to the target welding position (6) or relative to the positioning unit.

7. The device according to claim 6, wherein in order to be positioned within the tolerance area (5), the welding head (1) a part thereof is pressed against at least one profiled part (8) that has been placed into the device.

8. The device according to claim 6, further comprising a resiliently mounted profile contact (2,3) associated with the device that can be moved within the tolerance area (5) either relative to a profile support (16) or relative to the target welding position (6).

9. The device according to claim 1, further comprising, associated with the welding head (1), a drive carriage (19) and a support carriage (20) that can be moved relative to the drive carriage (19) within the tolerance area (5).

10. The device according to claim 1, wherein the profile contact (2, 3) is mounted so that it can be moved.

11. The device according to claim 1, further comprising an alarm that emits an alarm signal if the welding head (1) or a part thereof is positioned outside of the tolerance area (5) or if, prior to a positioning process, the compensation device ascertains on the basis of the dimensional deviation displayed by at least one of the profiled parts (8) that the positioning would have to be selected outside of the tolerance area (5).

12. The device according to claim 1, further comprising additional welding heads (1) which can each be positioned relative to another welding head (1, 9) in different, pre-specified or pre-specifiable welding positions (6), wherein the welding heads (1) or a part thereof can each be positioned or moved as a function of at least one dimensional deviation displayed by at least one of the profiled parts (8) within a spatial tolerance area (5) around the target welding position (6).

13. The device according to claim 1, further comprising additional welding heads (1, 9), wherein one of the additional welding heads (9) is arranged so as to be stationary, and wherein the other welding heads (1) or a part thereof, can each be positioned or moved within a spatial tolerance area (5) around a target welding position (6) as a function of at least one dimensional deviation from a target dimension displayed by at least one of the profiled parts (8).

14. The device according to claim 1, wherein during softening and/or during joining of the profiled part (8), a force directed towards the target position (6) acts on the welding head (1) or on a part thereof that has first been positioned within a tolerance area (5) around a target welding position.

15. The device according to claim 1, wherein during softening and/or during joining, a force directed towards the target position (6) acts on the welding heads (1) or on parts thereof that have first been positioned within a tolerance area around their target welding positions (6).

16. The device according to claim 1, wherein:
the welding head (1) or a part thereof that has first been positioned within a tolerance area around a target welding position (6) reaches or at least approaches its target welding position (6) during softening and/or during joining.

17. A method for welding profiled parts (8), especially plastic profiled parts, comprising:
a. specifying a target welding position (6) for a welding head and/or for a part of the welding head in relation to positions of first and second profile contacts (2, 3) that each are in contact with a respective profiled part (8) to be welded together,
b. positioning autonomously or automatically at least one heating element associated with the welding head (1) within a pre-specified or pre-specifiable tolerance area (5) around the target welding position (6), whereby the distance between the welding head (1) or part thereof and the target welding position (6) relative to another welding head (9) is a function of a target dimension of at least one dimensional deviation displayed by one of the profiled parts (8) to be welded,
d. softening or melting the profiled parts (8) that are to be welded, and
e. joining the softened profiled parts (8).

18. The method according to claim 17, wherein a force directed towards the target welding position (6) acts on the welding head (1) or on a part thereof that has first been positioned within a tolerance area around a target welding position (6).

19. The method according to claim 17, further comprising:
controlling the softening or joining so that the welding head (1) or a part thereof that has first been positioned within a tolerance area around the target welding position (6), reaches or at least approaches its target welding position (6).

20. The method according to claim 17, wherein the welding head (1) or a part thereof is movable at least within the tolerance area (5) against the force of a spring (15) relative to the target welding position (6), and is pressed against at least one profiled part (8).

* * * * *